(12) United States Patent
Ting

(10) Patent No.: US 7,843,174 B2
(45) Date of Patent: Nov. 30, 2010

(54) CONSTANT VOLTAGE TO CONSTANT CURRENT TRANSFERRING CONTROLLER

(75) Inventor: Ming Chiang Ting, Hsinchu (TW)

(73) Assignee: Niko Semiconductor Co., Ltd., Taipei (TW)

( * ) Notice: Subject to any disclaimer, the term of this patent is extended or adjusted under 35 U.S.C. 154(b) by 528 days.

(21) Appl. No.: 11/905,992

(22) Filed: Oct. 9, 2007

(65) Prior Publication Data

US 2009/0058377 A1    Mar. 5, 2009

(30) Foreign Application Priority Data

Aug. 27, 2007  (TW) .............................. 96131622 A

(51) Int. Cl.
*H02J 7/06* (2006.01)
*G05F 1/10* (2006.01)
(52) U.S. Cl. .................... 320/164; 320/159; 323/234
(58) Field of Classification Search ................ 320/164; 323/234
See application file for complete search history.

(56) References Cited

U.S. PATENT DOCUMENTS 5,023,541 A * 6/1991 Yosinski .................. 323/275
6,028,415 A * 2/2000 Nagai et al. .............. 320/162
6,124,700 A * 9/2000 Nagai et al. .............. 320/132
6,166,521 A * 12/2000 Mercer et al. ............. 320/125

* cited by examiner

*Primary Examiner*—Edward Tso
*Assistant Examiner*—Yalkew Fantu
(74) *Attorney, Agent, or Firm*—Rosenberg, Klein & Lee

(57) ABSTRACT

A constant voltage to constant current transferring controller includes a voltage signal transferring circuit, a current signal transferring circuit, and an error amplifier. The voltage signal transferring circuit receives a voltage detecting signal and a first reference voltage signal, and outputs a voltage signal transferring reference signal. The current signal transferring circuit receives a current detecting signal and a second reference voltage signal, and outputs a current signal transferring reference signal. The error amplifier receives the voltage signal transferring reference signal, the current signal transferring reference signal and a third reference voltage signal, and outputs an error amplifying signal. When the level of the voltage signal transferring reference signal is larger than the level of the current signal transferring reference signal, the error amplifier outputs the error amplifying signal according to the voltage signal transferring reference signal and the third reference voltage signal.

11 Claims, 4 Drawing Sheets

CONSTANT VOLTAGE TO CONSTANT CURRENT TRANSFERRING CONTROLLER

BACKGROUND OF THE INVENTION

1. Field of the Invention

The present invention relates to a power transferring control circuit. In particular, this invention relates to a constant voltage to constant current transferring control circuit.

2. Description of the Related Art

The constant voltage to constant current control is applied to the charging module of the lithium battery, and the current-limiting and voltage-regulating module, etc.

The charging module of the lithium battery utilizes the constant current control to quickly charge the lithium battery within the constant current control period. When the voltage of the lithium battery reaches a default protection level, the charging module of the lithium battery is switched to the constant voltage control for clamping the voltage level of the lithium battery. Thereby, the lithium battery is charged under a safety condition.

The current-limiting and voltage-regulating module uses the constant voltage control to control an output voltage. When an output current reaches to a default protection value, the current-limiting and voltage-regulating module is switched to the constant current control for clamping the output current. Thereby, the output current is limited against over-current condition.

FIG. 1 is a circuit diagram of the prior art that uses two error amplifiers to execute the voltage control and the current control. The circuit 10 uses an error amplifier 101 to receive an output voltage feedback signal VOS of the power converting module and a reference voltage level VR to perform the voltage feedback control. Thereby, the constant voltage control is implemented at the power converting module. The circuit 10 also uses an error amplifier 102 to receive the output current feedback signal VCSP of the power converting module and a reference current level VCSN to perform the current feedback control. Thereby, the constant current control is implemented at the power converting module. The control competition prevention at the output terminals of the error amplifiers 101, 102 is implemented by diodes 103, 104 to output control signal VFB to control the power converting module. The drawback of the circuit 10 is that the circuit 10 needs both the voltage feedback loop and the current feedback loop compensations. The compensation circuit adds and so the module cost increases.

FIG. 2 is a circuit diagram of another prior art that uses two error amplifiers to control the voltage and the current. The circuit 20 uses an error amplifier 201 to receive the output voltage feedback signal VOS of the power converting module and a reference voltage level VR to perform the voltage feedback control. Thereby, the constant voltage control is implemented at the power converting module. The circuit 20 also uses an error amplifier 202 to receive the output current feedback signal VCSP of the power converting module and a reference current level VCSN to perform the current feedback control. Thereby, the constant current control is implemented at the power converting module. The control competition prevention at the output terminals of the error amplifiers 201, 202 is implemented by an error amplifier 203 to output control signal VFB to control the power converting module. The drawback of the circuit 20 is that the gain of the error amplifier 203 cannot be exactly controlled. Therefore, the control loop cannot be exactly designed.

SUMMARY OF THE INVENTION

One particular aspect of the present invention is to provide a constant voltage to constant current transferring control circuit. It detects the voltage and current signal and uses the default reference voltage level to implement the voltage and current signal detection and the error amplifying function. Thereby, the constant voltage to constant current transferring control is implemented.

The constant voltage to constant current transferring controller includes a voltage signal transferring circuit, a current signal transferring circuit, and an error amplifier. The voltage signal transferring circuit receives a voltage detecting signal and a first reference voltage signal, and accordingly outputs a voltage signal transferring reference signal. The current signal transferring circuit receives a current detecting signal and a second reference voltage signal, and outputs a current signal transferring reference signal. The error amplifier receives the voltage signal transferring reference signal, the current signal transferring reference signal and a third reference voltage signal, and outputs an error amplifying signal. When the level of the voltage signal transferring reference signal is larger than the level of the current signal transferring reference signal, the error amplifier outputs the error amplifying signal according to the voltage signal transferring reference signal and the third reference voltage signal. When the level of the voltage signal transferring reference signal is smaller than the level of the current signal transferring reference signal, the error amplifier outputs the error amplifying signal according to the current signal transferring reference signal and the third reference voltage signal. Thereby, the constant voltage to constant current transferring control is implemented.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

The present invention uses an error amplifier to compare the output voltage feedback signal, the output current feedback signal and the reference voltage and switch between the constant current control and the constant voltage control. It also uses the voltage/current detecting signal transferring circuit to adjust the level(s) of the output voltage feedback signal and/or the output current feedback signal. Thereby, the control point for the constant voltage control and the constant current control is adjusted. The constant voltage to constant current transferring control circuit is illustrated.

Figure 1:
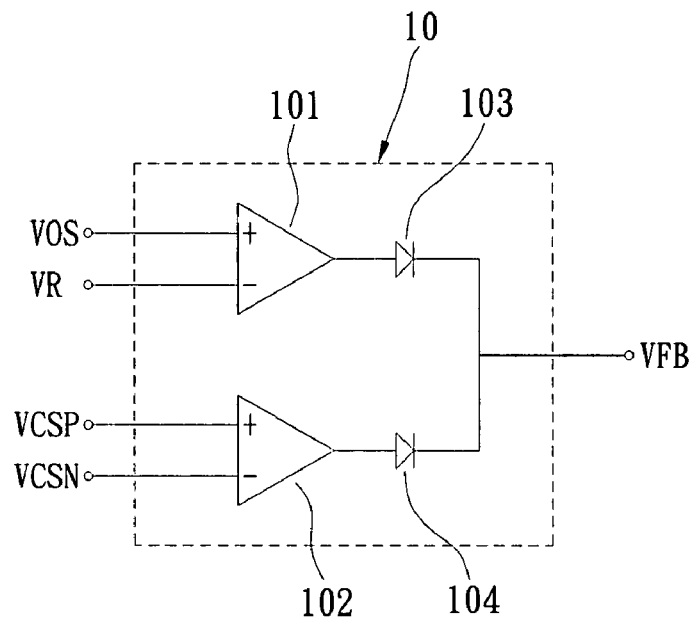
FIG. 1 is a circuit diagram of the prior art that uses two error amplifiers to control the voltage and the current.
Figure 2:
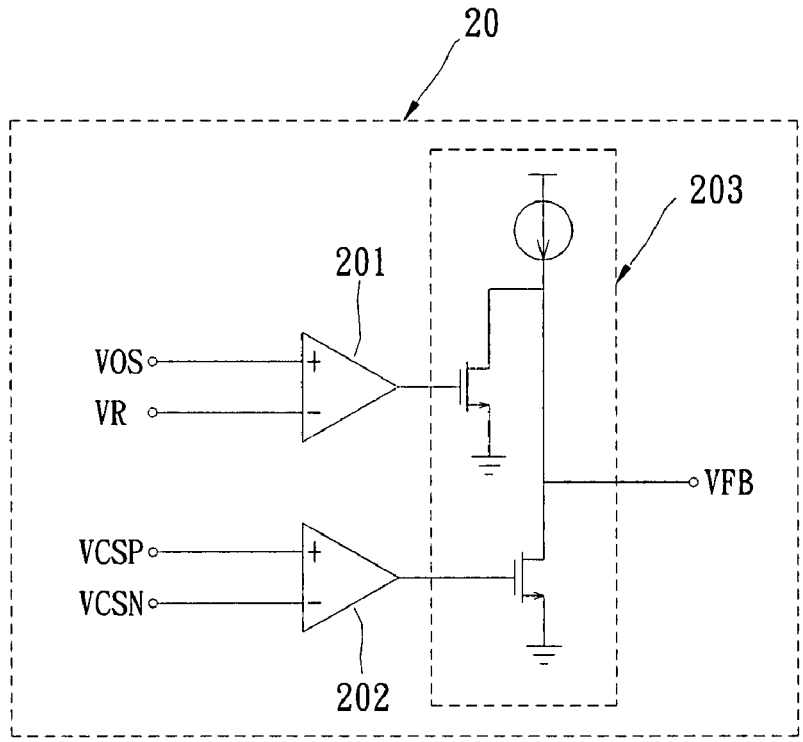
FIG. 2 is a circuit diagram of another prior art that uses two error amplifiers to control the voltage and the current.
Figure 3:
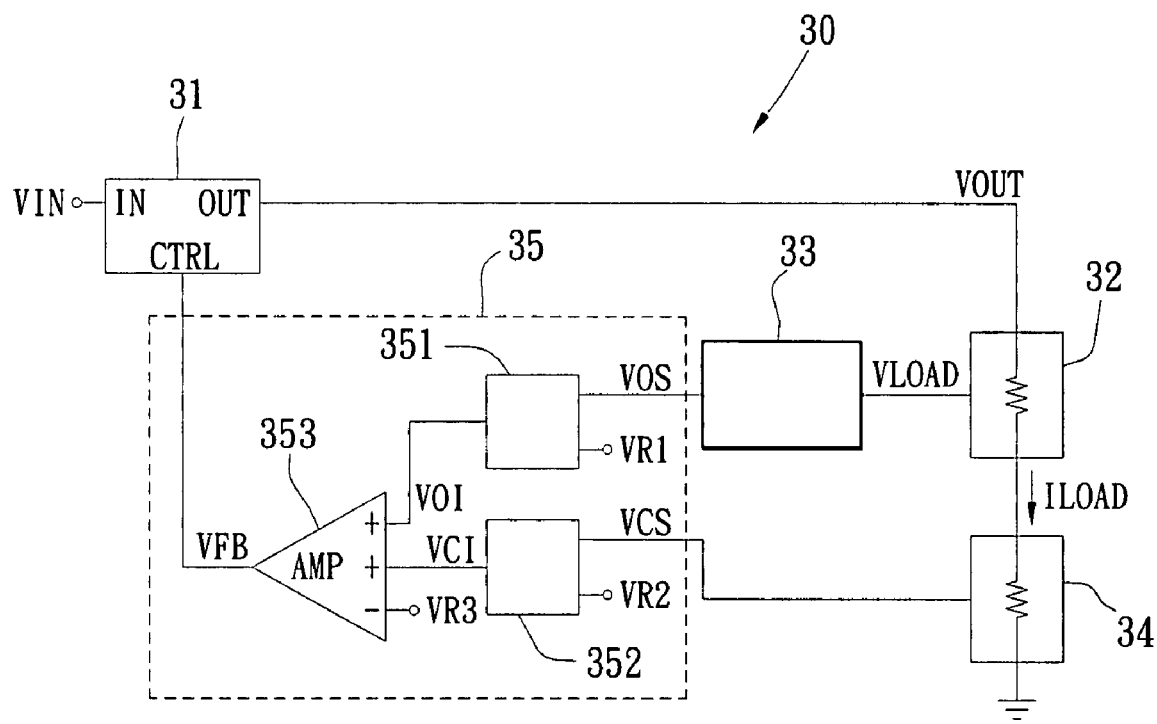
FIG. 3 is a circuit diagram of the constant voltage to constant current transferring control circuit of the present invention.

FIG. 3 is a circuit diagram of the constant voltage to constant current transferring control circuit of the present invention. The constant voltage to constant current transferring control circuit includes a voltage detecting circuit 33, a current detecting circuit 34, and a constant voltage to constant current transferring controller 35. The constant voltage to constant current transferring controller 35 includes a voltage detecting signal transferring circuit 351, a current signal transferring circuit 352, and an error amplifier 353. The constant voltage to constant current transferring controller 35 uses the voltage signal transferring circuit 351 to receive an output voltage detecting signal VOS outputted from the voltage sensing circuit 33 (in fact, the output voltage detecting signal VOS is a voltage difference between a set of voltage signals VOSP, VOSN in FIG. 4) and a first reference voltage signal VR1, and outputs a voltage signal transferring reference signal VOI that has been transferred with a DC voltage level. In this embodiment, VOI=VR1+A1*VOS. A1 is the gain of the voltage signal transferring circuit 351. The voltage signal transferring reference signal VOI is not affected by that the output loading 32 and the power converting module 30 do not have the same ground due to the current sensing circuit 34. The constant voltage to constant current transferring controller 35 also uses the current signal transferring circuit 352 to receive an output current detecting signal VCS outputted from the current sensing circuit 34 (in fact, the output current detecting signal VCS is a voltage difference between a set of voltage signals VCSP, VCOSN in FIG. 5, VSCN is the system common ground in this embodiment) and a second reference voltage signal VR2, and outputs a current signal transferring reference signal VCI that has been transferred with a DC voltage level. In this embodiment, VCI=VR2+A2*VCS. A2 is the gain of the current signal transferring circuit 352. Next, the constant voltage to constant current transferring controller 35 uses the error amplifier 353 to receive the voltage signal transferring reference signal VOI, the current signal transferring reference signal VCI and a third reference voltage signal VR3. When the level of the voltage signal transferring reference signal VOI is larger than the level of the current signal transferring reference signal VCI, the error amplifying signal VFB is generated according to the voltage signal transferring reference signal VOI and the third reference voltage signal VR3. At this time, the control circuit operates under a constant voltage control. By adjusting and controlling the power converting stage 31, the output voltage VLOAD is controlled at a stable voltage level. The power converting module 30 performs the constant voltage feedback control. When the level of the voltage signal transferring reference signal VOI is smaller than the level of the current signal transferring reference signal VCI, the error amplifying signal VFB is generated according to the current signal transferring reference signal VCI and the third reference voltage signal VR3. At this time, the control circuit operates under a constant current control. By adjusting and controlling the power converting stage 31, the output current ILOAD is controlled at a stable current level. The power converting module 30 performs the constant current feedback control. Thereby, the constant voltage to constant current transferring control is implemented. The power converting stage 31 is a transform function of the output power VOUT and the input power VIN.

Figure 4:
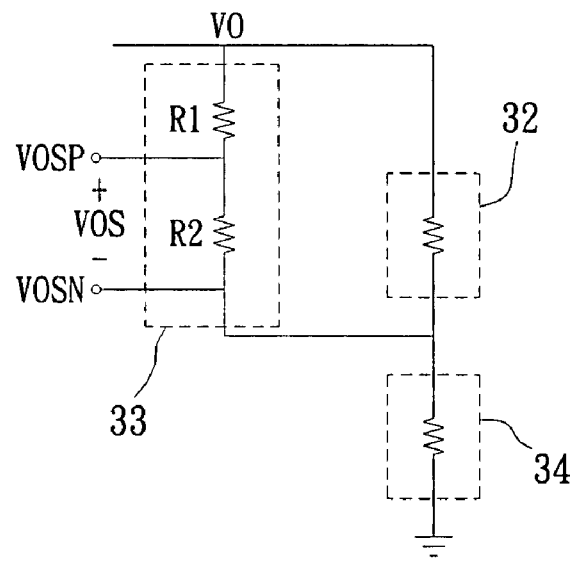
FIG. 4 is a circuit diagram of the voltage sensing circuit of an embodiment of the present invention.

FIG. 4 shows a circuit diagram of the voltage detecting circuit 33 of an embodiment in the present invention. By using the voltage-dividing resistors R1, R2, the output voltage detecting signal VOS is a ratio of the output voltage VO, VOS=VO*R2/(R1+R2). In an embodiment, the voltage detecting circuit 33 is connected with the output loading 32 in parallel and then is connected with the current detecting circuit 34 in serial, as shown in FIG. 4. Alternatively, the output loading 32 is connected with the current detecting circuit 34 in serial and then is connected with the voltage detecting circuit 33 in parallel. Of course, under the connection of the latter, the output voltage detecting signal VOS includes the cross voltage of the output loading 32 and the current detecting circuit 34. However, because the power converting module 31 uses the feedback control to control the cross voltage of the voltage detecting circuit 34 around a default cross voltage (e.g.:0.2V, in the current loop control), or below the default cross voltage (in the voltage loop control), the cross voltage of the current sensing circuit 34 may be compensated. Furthermore, in a high output voltage or a specific condition, such as the ratio between the cross voltage of the current sensing circuit 34 and the output voltage detecting signal VOS is small, or does not affect the operation of the power converting module 31, the cross voltage of the current sensing circuit 34 may be omitted and does not need to be compensated.

Figure 5:
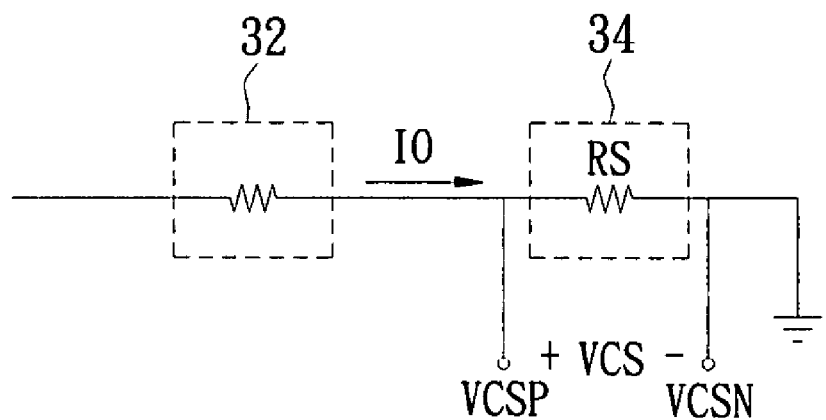
FIG. 5 is a circuit diagram of the current sensing circuit of an embodiment of the present invention.

FIG. 5 shows a circuit diagram of the current sensing circuit 34 of an embodiment in the present invention. It uses a sensing resistor RS and an output current IO to generate the current detecting signal VCS, VCS=RS*IO. In an embodiment, the output loading 32 is connected between the current detecting circuit 34 and the ground, as shown in FIG. 3, which current passes through the output loading 32, the current detecting circuit 34 and the ground orderly. Alternatively, the current sensing circuit 34 is connected between the output loading 32 and the ground, which current passes through the current detecting circuit 34, the output loading 32 and the ground orderly. Thereby, in the latter, the problem of the common ground for the power converting module 30 and the output loading 32 is solved.

Figure 6:
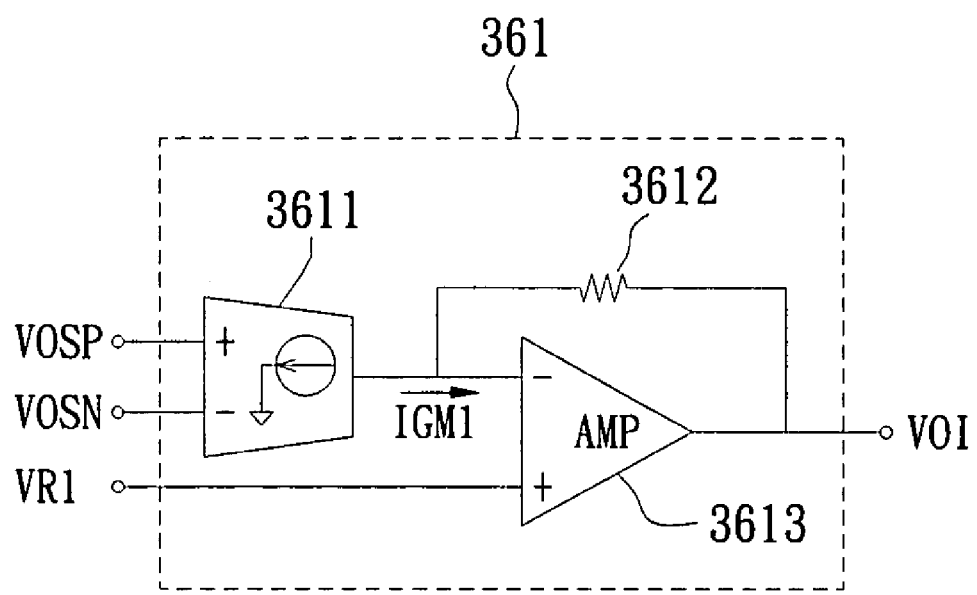
FIG. 6 is a circuit diagram of the voltage signal transferring circuit of an embodiment of the present invention.

FIG. 6 shows a circuit diagram of the voltage signal transferring circuit of an embodiment of the present invention. The circuit 361 uses a transconductance amplifier 3611 to compare the output voltage signals VOSP, VOSN of the voltage detecting circuit 33 and output a difference current IGM1. Next, the circuit 361 uses a feedback resistor 3612 and an operation amplifier 3613 to form a feedback gain amplifier. By referring to the first reference voltage VR1 and the difference current IGM1, operations of DC voltage level shifting and amplifying are preformed and the voltage signal transferring reference signal VOI is implemented. VOI=VR1+A1*VOS, where VOS is the difference between the voltage signals VOSP and VOSN, and A1 is the gain of the voltage signal transferring circuit 361. A1=GMI1*RI1, where GMI1 is the transconductance value of the transconductance amplifier 3611, and RI1 is the resistance of the resistor 3612.

Figure 7:
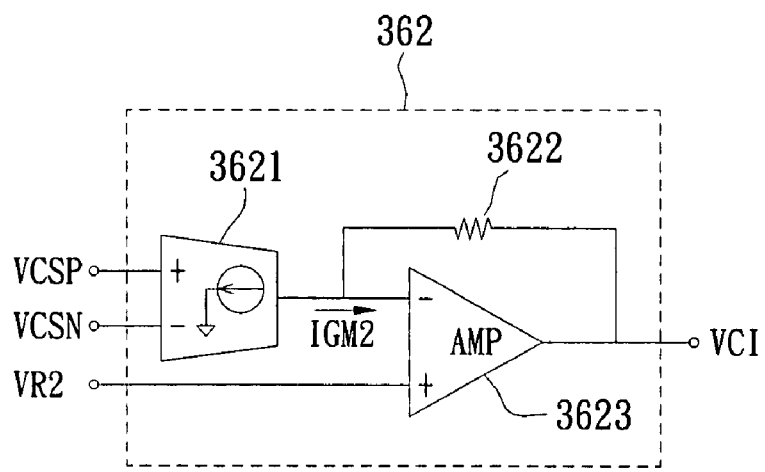
FIG. 7 is a circuit diagram of the current signal transferring circuit of an embodiment of the present invention.

FIG. 7 shows a circuit diagram of the current signal transferring circuit of an embodiment of the present invention. The circuit 362 uses a transconductance amplifier 3621 to compare the output voltage signals VCSP, VCSN of the current detecting circuit 34 and output a difference current IGM2. Next, the circuit 362 uses a feedback resistor 3622 and an operation amplifier 3623 to form a feedback gain amplifier. By referring to the second reference voltage VR2 and the difference current IGM2, operations of DC voltage level shifting and amplifying are preformed and the current signal transferring reference signal VCI is implemented. VCI=VR2+A2*VCS, where VCS is the difference between the voltage signals VCSP and VCSN, and A2 is the gain of the current signal transferring circuit 362. A2=GMI2*RI, where GMI2 is the transconductance value of the transconductance amplifier 3621, and RI2 is the resistance of the resistor 3622.

Although the embodiments in FIGS. 6 and 7 respectively use the voltage signal transferring circuit and the current signal transferring circuit as an example, in practice, the circuits in FIGS. 6 and 7 both can be used as the voltage signal transferring circuit or the current signal transferring circuit, not limited to above.

The voltage signal transferring circuit 351 is used for adjusting the output voltage detecting signal VOS, and the current signal transferring circuit 352 is used for adjusting the output current detecting signal VCS to adjust the control point for the constant current control or/and the constant voltage control of the power converting module 30. In an embodiment, the voltage signal transferring circuit 351 and the current signal transferring circuit 352 can be added or omitted according to whether the output voltage detecting signal VOS and the output current detecting signal VCS need to be adjusted or not.

Figure 8:
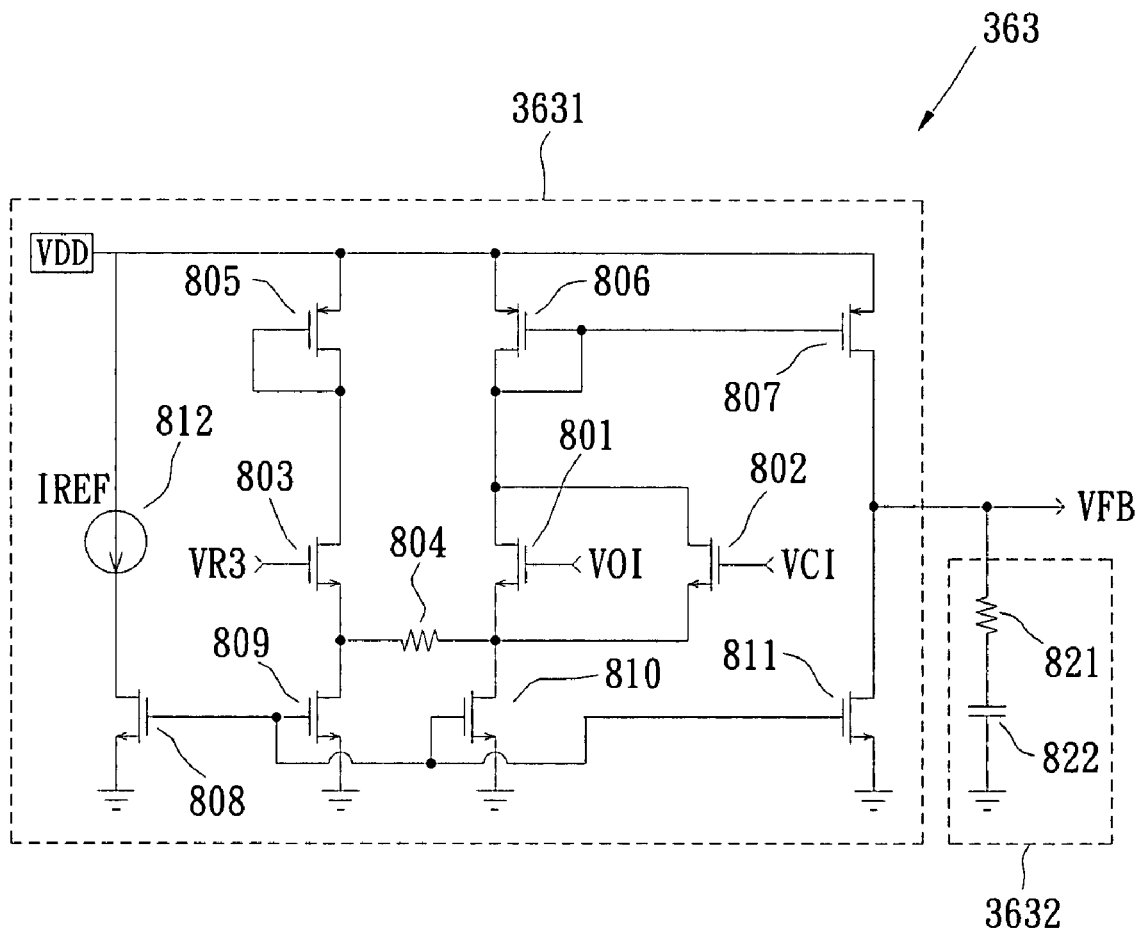
FIG. 8 is a circuit diagram of the error amplifier of an embodiment of the present invention.

FIG. 8 shows a circuit diagram of the error amplifier 353 of an embodiment of the present invention. The circuit 353 includes a transconductance amplifier 3631 and a compensation network 3632. The transconductance amplifier 3631 comprises a differential amplifier pair constituted by the transistors 801, 802, and 803. The resistor 804 is a transconductance unit. The reference current source 812, the transistors 808, 809, 810, 811 are the bias current source. The transistors 805, 806 are the active loading. The differential amplifier pair (the transistors 801, 802, 803) compares the third reference voltage VR3, the voltage signal transferring reference signal VOI and the current signal transferring reference signal VCI and generates a difference current via the resistor 804, and difference current is transmitted by the transistor 806. The transistor 805 is a symmetrical loading for implementing a symmetry of the differential amplifying. The transistor 807 and the transistor 806 form a current mirror for outputting the current, and the output current of the transconductance amplifier 3631 is determined according to the bias current source of the transistor 811. The compensation network 3632 includes a loading resistor 821 and a compensation capacitor 822 for receiving the output current of the transconductance amplifier 3631 and implementing the error amplifying signal VFB outputted from the error amplifier 363. At the same time, the loop compensation of the power converting module is implemented.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A constant voltage to constant current transferring controller, comprising:

a signal transferring circuit for receiving a current detecting signal and a first reference voltage signal, and accordingly outputting a current detecting reference signal; and an error amplifier for receiving a voltage detecting signal, the current detecting reference signal and a second reference voltage signal, and outputting an error amplifying signal;

wherein, when the level of the current detecting reference signal is larger than the level of the voltage detecting signal, the error amplifier outputs the error amplifying signal according to the current detecting reference signal and the second reference voltage signal, and when the level of the current detecting reference signal is smaller than the level of the voltage detecting signal, the error amplifier outputs the error amplifying signal according to the voltage detecting signal and the second reference voltage signal.

2. The constant voltage to constant current transferring controller as claimed in claim 1, wherein the signal transferring circuit includes a difference amplifier that receives the current detecting signal and the first reference voltage signal and outputs the current detecting reference signal.

3. The constant voltage to constant current transferring controller as claimed in claim 1, wherein the signal transferring circuit includes a transconductance amplifier and a feedback gain amplifier, the transconductance amplifier receives the output current detecting signal and outputs a difference current, and the feedback gain amplifier generates the current detecting reference signal according to the difference current and the first reference voltage signal.

4. A constant voltage to constant current transferring controller, comprising:

a signal transferring circuit for receiving a voltage detecting signal and a first reference voltage signal, and accordingly outputting a voltage detecting reference signal; and an error amplifier for receiving a current detecting signal, the voltage detecting reference signal and a second reference voltage signal, and outputting an error amplifying signal;

wherein, when the level of the voltage detecting reference signal is larger than the level of the current detecting signal, the error amplifier outputs the error amplifying signal according to the voltage detecting reference signal and the second reference voltage signal, and when the level of the voltage detecting reference signal is smaller than the level of the current detecting signal, the error amplifier outputs the error amplifying signal according to the current detecting signal and the second reference voltage signal.

5. The constant voltage to constant current transferring controller as claimed in claim 4, wherein the signal transferring circuit includes a difference amplifier that receives the voltage detecting signal and the first reference voltage signal and outputs the voltage detecting reference signal.

6. The constant voltage to constant current transferring controller as claimed in claim 4, wherein the signal transferring circuit includes a transconductance amplifier and a feedback gain amplifier, the transconductance amplifier receives the voltage detecting signal and outputs a difference current, and the feedback gain amplifier generates the voltage detecting reference signal according to the difference current and the first reference voltage signal.

7. A constant voltage to constant current transferring control circuit, comprising:

a current detecting circuit for generating a current detecting signal according to an output current flowing through a loading;

a voltage detecting circuit for generating a voltage detecting signal according to the loading;

a signal transferring circuit for receiving the current detecting signal and a first reference voltage signal, and accordingly outputting a current detecting reference signal; and an error amplifier for receiving the voltage detecting signal, the current detecting reference signal and a second reference voltage signal, and outputting an error amplifying signal;

wherein, when the level of the current detecting reference signal is larger than the level of the voltage detecting signal, the error amplifier outputs the error amplifying signal according to the current detecting reference signal and the second reference voltage signal, and when the level of the current detecting reference signal is smaller than the level of the voltage detecting signal, the error amplifier outputs the error amplifying signal according to the voltage detecting signal and the second reference voltage signal.

8. The constant voltage to constant current transferring control circuit as claimed in claim 7, wherein the signal transferring circuit includes a difference amplifier that receives the current detecting signal and the first reference voltage signal and outputs the current detecting reference signal.

9. The constant voltage to constant current transferring control circuit as claimed in claim 7, wherein the signal transferring circuit includes a transconductance amplifier and a feedback gain amplifier, the transconductance amplifier receives the current detecting signal and outputs a difference current, and the feedback gain amplifier generates the current detecting reference signal according to the difference current and the first reference voltage signal.

10. The constant voltage to constant current transferring control circuit as claimed in claim 7, wherein the voltage detecting circuit is connected with the loading in parallel and then is connected with the current sensing circuit in serial.

11. The constant voltage to constant current transferring control circuit as claimed in claim 7, wherein the current sensing circuit is connected with the loading in serial and then is connected with the voltage detecting circuit in parallel.

* * * * *